United States Patent
Evrard

(12) 
(10) Patent No.: US 7,798,800 B2
(45) Date of Patent: Sep. 21, 2010

(54) METHOD AND DEVICE FOR HEATING THERMOPLASTIC PREFORMS

(75) Inventor: Alain Evrard, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 642 days.

(21) Appl. No.: 11/665,968

(22) PCT Filed: Oct. 20, 2005

(86) PCT No.: PCT/FR2005/002611

§ 371 (c)(1),
(2), (4) Date: Apr. 20, 2007

(87) PCT Pub. No.: WO2006/045926

PCT Pub. Date: May 4, 2006

(65) Prior Publication Data

US 2008/0102148 A1    May 1, 2008

(30) Foreign Application Priority Data

Oct. 22, 2004   (FR) .................................. 04 11300

(51) Int. Cl.
*B29B 13/08* (2006.01)
(52) U.S. Cl. ...................... 425/174.4; 425/185; 425/526
(58) Field of Classification Search ................. 425/526, 425/174.4, 182, 185; B29C 49/68
See application file for complete search history.

(56) References Cited

U.S. PATENT DOCUMENTS

| 4,076,071 | A | * | 2/1978 | Rosenkranz et al. ........ 165/263 |
| 4,284,874 | A | * | 8/1981 | Prichard et al. ............. 219/215 |
| 5,549,468 | A | * | 8/1996 | Mitchell et al. ............. 425/526 |
| 5,980,229 | A |   | 11/1999 | Collombin et al. |
| 6,632,087 | B1 |   | 10/2003 | Armellin et al. |
| 6,841,132 | B2 | * | 1/2005 | Samsoondar ................ 422/102 |
| 6,888,103 | B2 | * | 5/2005 | Vaughn et al. .............. 219/388 |

FOREIGN PATENT DOCUMENTS

| DE | 18 16 489 A1 | 8/1970 |
| DE | 100 58 950 A1 | 4/2002 |

* cited by examiner

*Primary Examiner*—Maria Veronica D Ewald
(74) *Attorney, Agent, or Firm*—Sughrue Mion, PLLC

(57) ABSTRACT

A method and device for heating at least one blank which is used to produce a container, such as a bottle, from a thermoplastic material, particularly PET, by means of blow molding or stretch blow molding. The blank is disposed between two opposing lateral walls which are positioned at a distance from one another. One of the walls supports several radiation sources which are disposed one above the other opposite the body of the blank. The space between the two lateral walls is closed at least partially beyond and close to the base of the blank. At least part of the radiation emitted beyond the base of the blank is reflected in the direction of the body of the blank. In this way, losses due to lost radiation are limited.

19 Claims, 4 Drawing Sheets

US 7,798,800 B2

METHOD AND DEVICE FOR HEATING THERMOPLASTIC PREFORMS

FIELD OF THE INVENTION

The present invention relates in general to the field of manufacturing containers, such as bottles, made of a thermoplastic, from heated preforms by a blow molding or stretch blow-molding process, and it relates more specifically to improvements made in the field of heating at least one preform intended for the manufacture of a container, such as a bottle, made of a thermoplastic, especially PET, by blow molding or stretch-blow.molding, the preform being placed between two lateral walls facing each other a certain distance apart and one of said walls, supporting several radiation sources placed one above another so as to face the body of the preform.

DESCRIPTION OF THE PRIOR ART

In practice, as illustrated schematically in FIG. 1 of the appended drawings, the preform 1 (in general a container preform, as illustrated in this figure, or an intermediate container in processes with successive multiple blowing stages) is heated on the move, being rotated about itself (arrow 9), while being placed usually with its neck 11 facing downward, in an oven 2 of duct shape, one lateral wall 3 of which is provided with a succession of sets 4 of radiation sources 5 (in general a succession of superposed tubular lamps emitting short-infrared radiation, which is absorbed by the thermoplastic and heated to the core) and the opposed lateral wall 6 of which may advantageously be provided with reflecting means 7. The bottom of the oven is provided with protective means 10 designed to form a heat shield capable of protecting the neck 11 of the preform 1 and of preventing it from deforming. Each set 4 of the radiation sources 5 comprises a number of sources in relation to the length of the body 8 of the largest preform 1 that can be treated in the oven. To heat smaller preforms, only the appropriate number of sources 5 of each set 4 in relation to the length of the body 8 of the preform 1 is employed (in the example shown in FIG. 1, the upper two sources $5_9$ and $5_8$ are not in use).

Each radiation source 5 emits over a wide cone so that at least an appreciable portion Q of the radiation emitted by the upper source in use, $5_7$, or even several upper sources, $5_7$ and $5_6$, and also a smaller portion q of the radiation emitted by the other sources $5_5$ to $5_1$, located lower down pass above the closed end of the preform 1 and are lost.

Thermoplastic container manufacturers presently seek to reduce as far as possible the inherent charges associated with the operation of the machines for manufacturing these containers, and especially the consumption of electrical energy by these machines.

Now, the preform-heating oven consumes most (around 70 to 90%) of the electrical energy in an installation for manufacturing thermoplastic containers.

Consequently, any reduction, albeit a small one, in losses in the oven is reflected by an appreciable concomitant reduction in the consumption of electrical energy, and therefore in a financial saving and better profitability of the machine.

SUMMARY OF THE INVENTION

The object of the invention is therefore to meet this expectation of users and to provide means suitable for appreciably reducing the losses in the preform-heating oven and the consumption of electrical energy by it.

For these purposes, according to a first of its aspects, the invention provides a method of heating at least one preform intended for the manufacture of a container, such as a bottle, made of a thermoplastic, especially PET, by blow molding or stretch-blow molding, the preform being placed between two lateral walls facing each other a certain distance apart and one of said walls supporting several radiation sources placed one above another so as to face said body of the preform, which method, being in accordance with the invention, is characterized in that the gap between the two lateral walls is at least partly closed, beyond the closed end of the preform and near to said closed end, and in that at least some of the radiation emitted beyond the closed end of the preform is reflected toward the body of the preform.

Thanks to these arrangements, the losses due to lost radiation are limited. To be specific, it is possible to achieve, by using the arrangements according to the invention, a reduction in the consumption of electrical energy by the oven of around 10%, while at the same time improving the level of heating of the preform by around 3%.

However, to prevent the heating device from suffering thermal runaway and to prevent the preform from being overheated, it is desirable to leave space for ventilation. To do this, about three-quarters of the gap between the two lateral walls is closed off.

Moreover, it turns out to be preferable to place the preform neck down, since, in this arrangement, the partial closure being at the top, the result is a reduction in convected losses.

In practice, a multiplicity of preforms are heated on the run in an elongate oven of duct shape, the preforms being moved by transport means between the two walls, parallel to them. Provision may then be made for the gap between the two walls to be closed only over certain selected portions so that the moved preforms undergo a predetermined heating profile, it being possible for this arrangement to be advantageously combined with other conventional solutions, such as lack of discrete heating selectively at certain vertical and/or longitudinal locations.

According to a second of its aspects, the invention proposes, for implementing the above method, a device for heating at least one preform intended for the manufacture of a container, such as a bottle, made of a thermoplastic, especially PET, by blow molding or stretch-blow molding, said heating device comprising two lateral walls facing each other a certain distance apart, between which a preform is located, one of said lateral walls supporting several radiation sources placed one above another so as to face the body of the preform, which device, being positioned in accordance with the invention, is characterized in that a transverse wall is placed beyond the closed end of the preform and near it, said plate #5' extending at least partly between the two said lateral walls, the face of this transverse plate that lies facing the closed end of the preform being reflective for the radiation emitted by said sources, whereby at least some of the radiation emitted beyond the closed end of the preform is reflected toward the body of the preform so that the losses due to lost radiation are limited.

Advantageously, the device is further improved by placing the preform neck down since, in this case, the convective losses are limited.

In order for the heating device to be able to be exploited as flexibly as possible and to be capable of treating preforms of a very wide range of sizes, it is desirable for the transverse plate to be removably mounted. One advantageous solution for this purpose may consist in the transverse plate being positioned with fastening means identical to the fastening means for fastening each radiation source in its respective support, so that said transverse plate can be fitted instead of a radiation source in the support therefor. The transverse plate may thus be positioned near the closed end of the preform, irrespective of the length of the preform. In this context, a preferred embodiment consists, when the radiation sources are of tubular general shape, in that the transverse plate is of elongate shape and has the same length as a radiation source. In particular, in a specific embodiment, provision may be made for the means for fastening the transverse plate to be longitudinal projecting fingers of the same conformation as the contact sockets for the radiation sources and suitable for being engaged in the members for receiving the contact sockets of the radiation sources.

To prevent the preform from overheating, it is desirable for the transverse plate to have a width corresponding to about three-quarters of the space between the two lateral walls, so as to leave sufficient space for ventilation.

The arrangements of the invention may advantageously be applicable in heating devices shaped in the form of an elongate duct and including transport means for moving the preform between the two walls, parallel to them. It is then conceivable to place transverse plates at certain locations between the two walls selected so that the preform moved between the walls is subjected to a predetermined heating profile.

In one specific embodiment, the lower face of the transverse plate is coated with a layer of a ceramic that is reflective for the wavelength of the radiation, it being advantageously possible for the transverse plate to be made of aluminum.

BRIEF DESCRIPTION OF THE DRAWINGS

The invention will be more clearly understood on reading the following detailed description of certain preferred embodiments given solely by way of nonlimiting examples. In this description, reference will be made to the appended drawings in which.

DETAILED DESCRIPTION OF THE INVENTION

Figure 1:
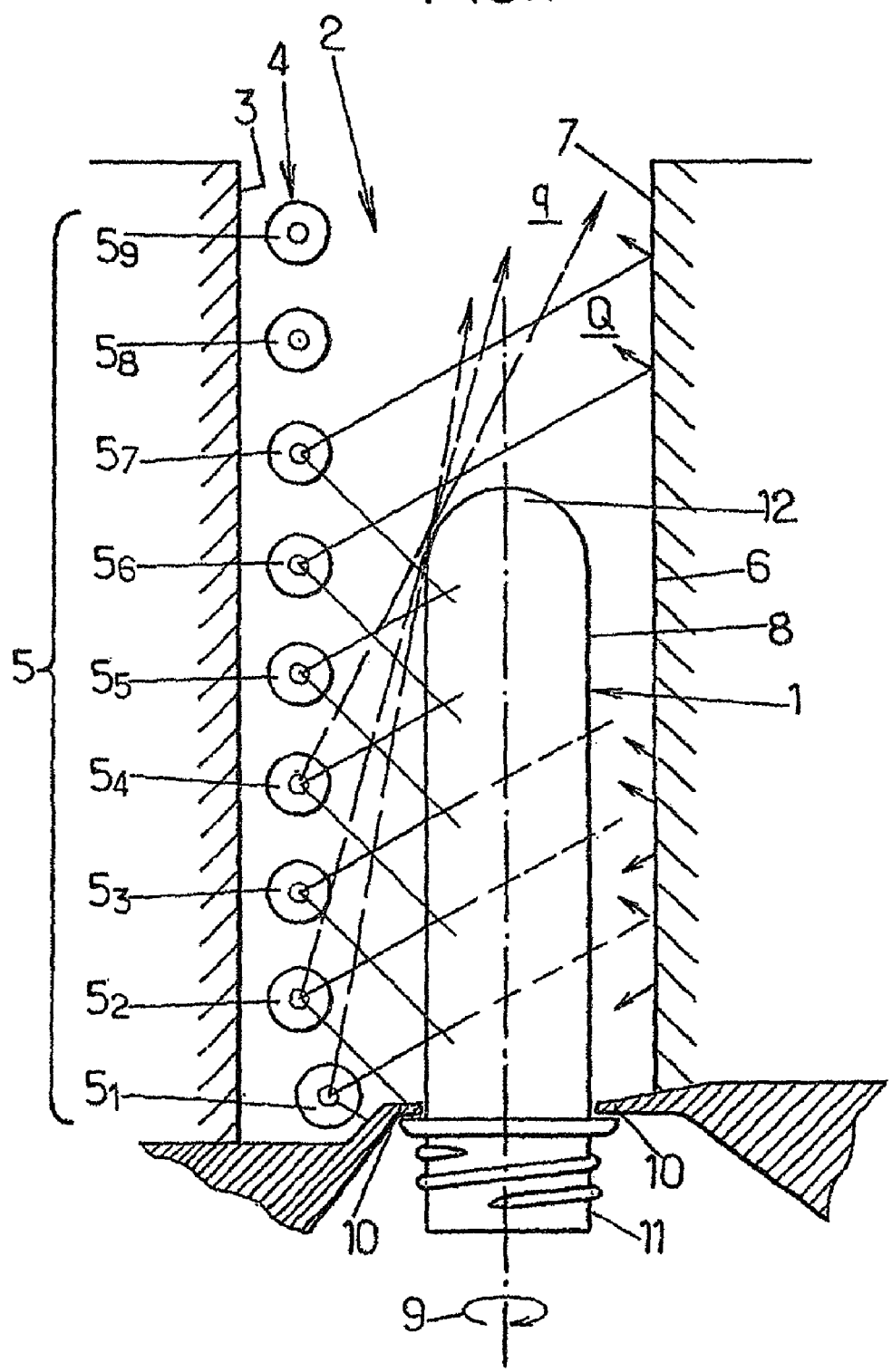
FIG. 1 is a highly schematic representation of a heating device of the prior art, illustrating its drawbacks.
Figure 2:
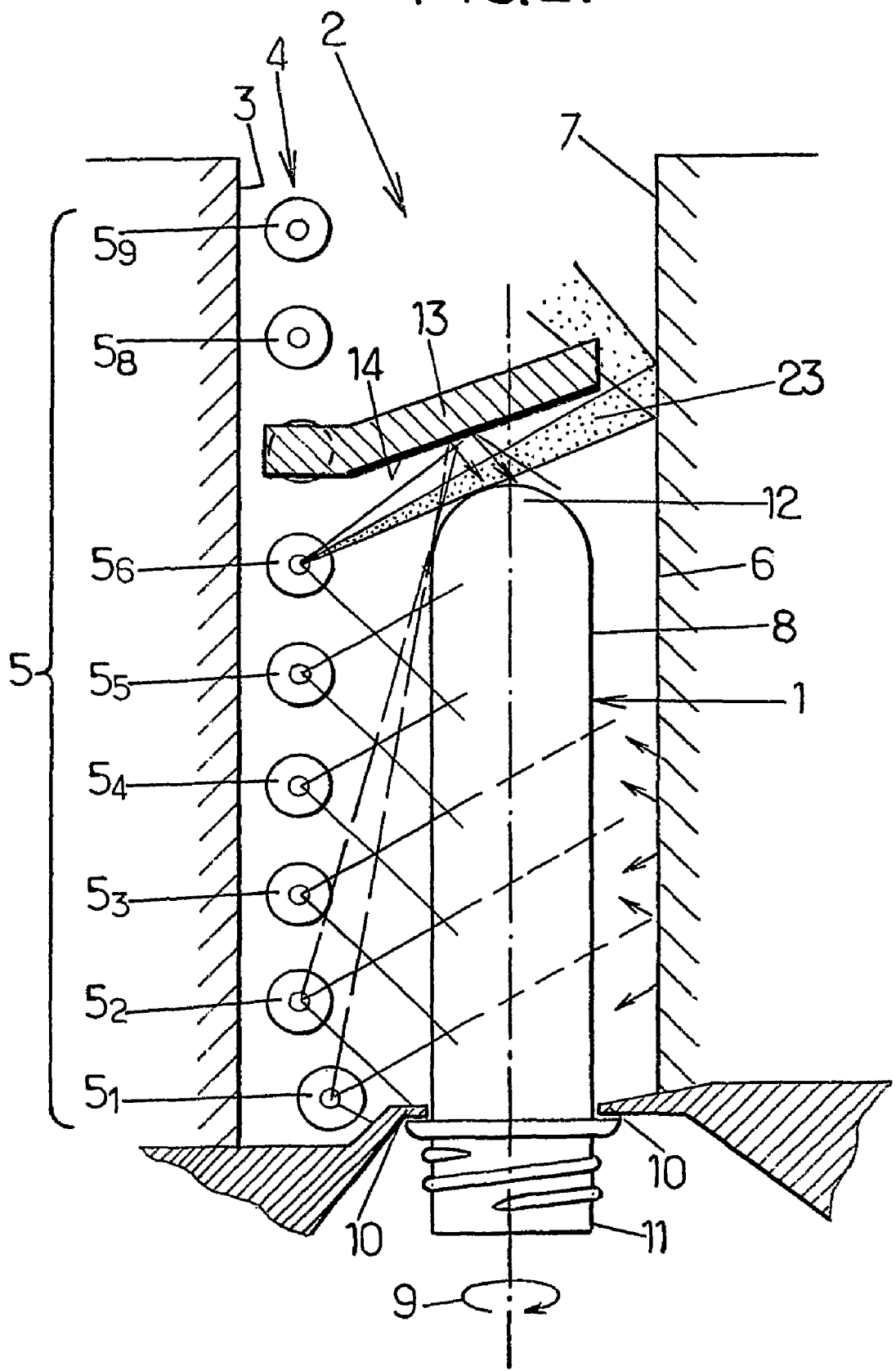
FIG. 2 is a representation, similar to that of FIG. 1, of a heating device positioned in accordance with the invention, illustrating the advantages.

FIG. 2 shows the oven 2 of FIG. 1 with, inside it, a preform 1, in this case a preform identical to that in FIG. 1 placed here with its neck 11 down (see FIG. 2, the same numerical references as in FIG. 1 are retained in order to denote the same elements). In the oven 2, which here is arranged in accordance with the invention, the gap between the two lateral walls 3 and 6 is at least partly closed, beyond the closed end 12 of the preform 1 and near said closed end 12, here above the closed end 12, the neck 11 of the preform being placed at the bottom, so that at least some of the radiation emitted beyond the closed end of the preform is reflected toward the body of the preform, thereby limiting the losses due to lost radiation. Furthermore, with the arrangement shown, the preform being placed with the neck 11 down and the closed end 12 up, the convective losses are limited. Advantageously, about three-quarters of the gap between the two lateral walls 3, 6 are closed so as to leave a passage for ventilation, preventing the oven from overheating.

For this purpose, according to the invention, at least one transverse plate 13, extending at least partly between the two aforementioned lateral walls 3, 6, is placed beyond the closed end 12 of the preform 1 and near the latter, the face 14 of this transverse plate, which lies facing the closed end 12 of the preform 1 (here the lower face in the arrangement of the preform with its neck 11 down), being reflective for the radiation emitted by said sources 5.

In practice, the transverse plate 13 is removably mounted on one 3 of the lateral walls of the oven, using means that will be explained later. In this way, the same plate 13 can be mounted selectively at the appropriate place inside the oven in such a way that it is not positioned too far from the preform so that the desired effect can be obtained under optimum conditions.

As shown in FIG. 2, the sources 51 to 56 are operating. Most of the radiation that would have been lost in the conventional arrangement of FIG. 1 is, here, intercepted by the plate 13 and reflected towards the preform 1, either directly or indirectly with intermediate reflection off the reflecting means 7 of the lateral wall 6. Only a narrow pencil of radiation 23 (shown in gray in FIG. 2) is not intercepted.

Figure 3:
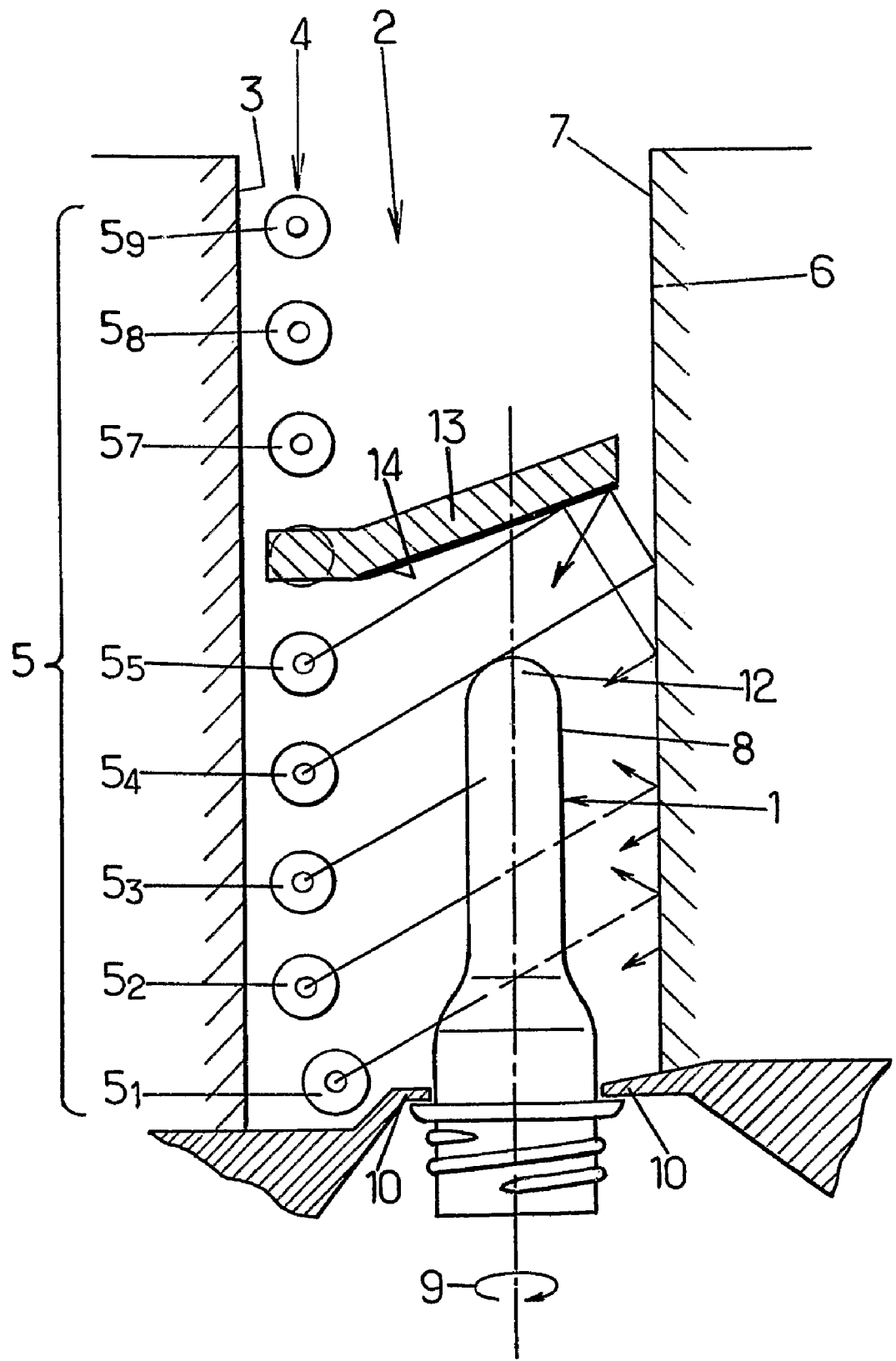
FIG. 3 is a representation of the oven of FIG. 2, configured differently in relation to a shorter preform.

In FIG. 3, a preform 1 of substantially shorter length than that of FIG. 2 is placed in the same oven 2. Again, for optimum operation of the arrangement according to the invention, the plate 13 is mounted lower down in the oven, and only the sources 51 to 55 are then operating.

Figure 4:
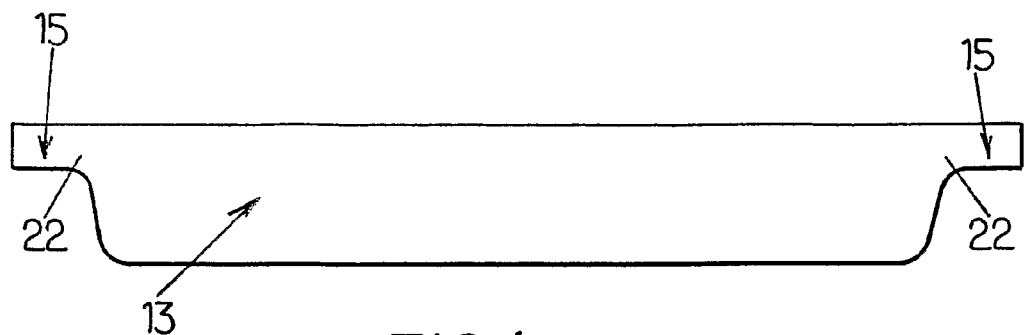
FIG. 4 is a top view of a preferred embodiment of a transverse plate according to the invention for equipping the heating device of FIGS. 2 and 3.

As can be seen in FIG. 4, the plate 13 has a rectangular general shape and is fashioned so as to extend transversely, between the two lateral walls 3, 6 of the oven, over about three-quarters of the gap, the plate being inclined, as may be seen in FIGS. 2 and 3. The angle of inclination is chosen so that the reflecting face 14 reflects the radiation back toward the preform 1 or the wall 6. The angle may be chosen between 10° and 30°.

To make it easier to mount the plate 13 at the required height in relation to the length of the preform to be treated, a structurally very simple solution consists in positioning the transverse plate 13 with fastening means 15 identical to the means for fastening each radiation source 5 in its respective support, so that said transverse plate can be fitted instead of a radiation source in the support therefor.

In practice, the radiation sources are elongated lamps of tubular general shape. The transverse plate 13 is then of elongate rectangular shape, as may be seen in FIG. 4, and has the same length as a radiation source.

Figure 5A:
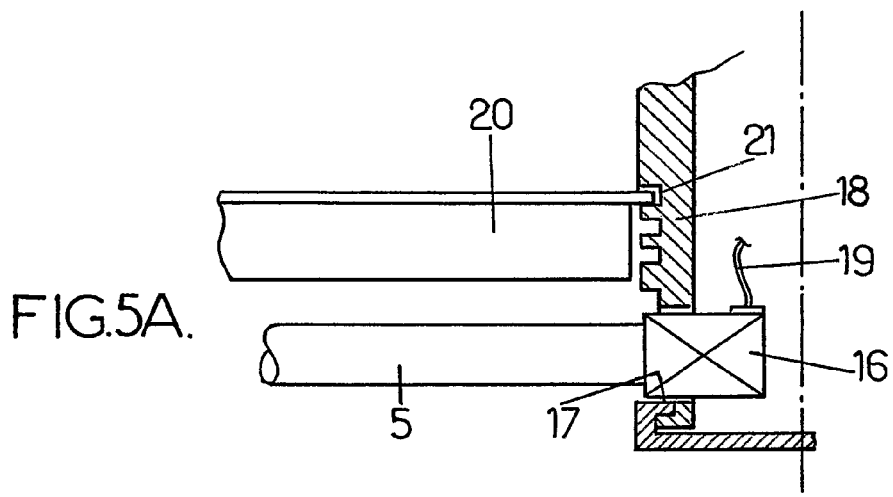
FIG. 5A is a partial view illustrating, on a larger scale, the method of fastening one end of a heating lamp of the heating device.

FIG. 5A shows a standard way, in the Applicant's heating devices, of mounting one end of a radiation source 5. The source 5 is provided at its end with a contact socket 16, typically of square cross section, which is engaged in an opening 17 of complementary shape provided in a transverse support partition 18 forming part of the structure of the oven. 2, the partition 18 and the opening 17 forming support member for the socket. A power supply lead 19 is attached (especially soldered) to the socket 16. Situated behind the source 5 is a thermal insulation wall 20 that protects the rest of the structure, said wall 20 being retained in a groove 21 of the transverse partition 18.

Figure 5B:
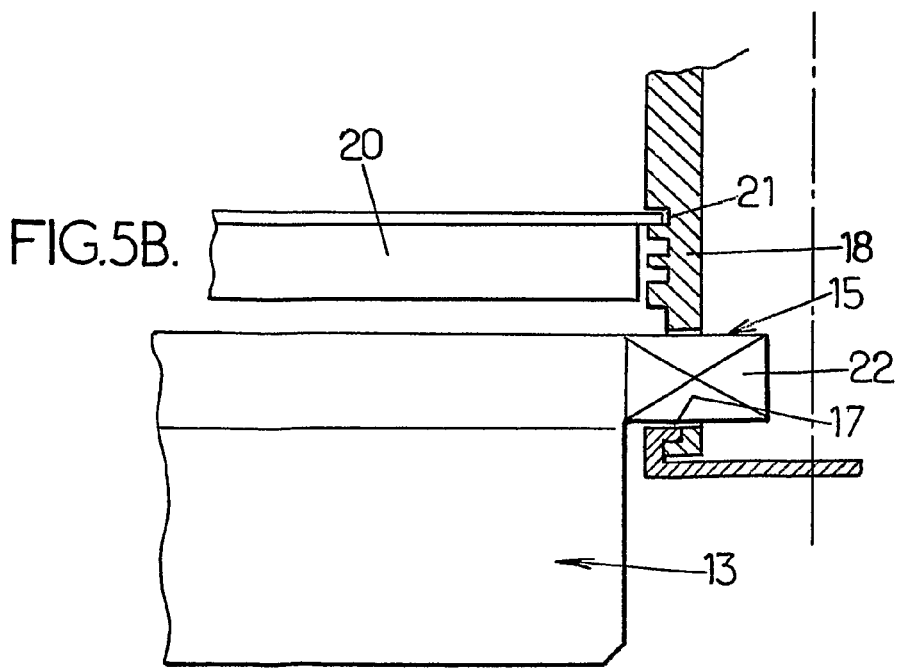
FIG. 5B is a partial view illustrating, on a larger scale, the method of fitting, copied from that shown in FIG. 5A, in a preferred embodiment of the transverse plate of FIG. 4.

Under these conditions, as shown in FIG. 5B, the means 15 for fastening the transverse plate 13 are longitudinal projecting fingers 22 of the same shape as the contact sockets 16 of the radiation sources—in other words of square shape in the example considered—and are suitable for being engaged in the openings 17 for accommodating the contact sockets of the radiation sources.

In installations for manufacturing containers continuously and with a high production rate, such as those widely sold by the Applicant, the oven 2 has the general form of an elongate duct and includes transport means for moving the preforms 1, one after another, between the two walls 3, 6, parallel to them, while rotating the preforms 1 about themselves (arrow 9). It is standard practice, in such an-oven configuration, to vary the preform heating in order too obtain a heating profile matched to the deformation then imposed during blow molding. One variation often consists in leaving certain sources, or even certain sets of sources, unactivated, or preferably in regulating the individual power of the sources.

In this context, it may be envisaged carrying out such a heating variation by providing for the transverse plates 13 to be placed at certain selected locations between the two walls so that the preform moved between the walls is subjected to a predetermined heating profile. In other words, provision may be made for the plates 13 to be placed at certain locations, but not at other locations. Advantageously, provision may be made for the lower face 14 of the transverse plate 13 to be coated with a layer of a ceramic that is reflected for the wavelength of the radiation, in practice short-infrared radiation.

The transverse plate 13 is, for simplicity and low cost, made of aluminum.

The invention claimed is:

1. A device for heating at least one preform intended for the manufacture of a container made of a thermoplastic by blow molding or stretch-blow molding, said heating device comprising two lateral walls facing each other a certain distance apart, between which a preform is placed, one of said lateral walls supporting several radiation sources placed one above another so as to face the body of the preform, at least one transverse plate being placed beyond the closed end of the preform and near the latter and extending at least partly between the two said lateral walls, the lower face of this transverse plate that lies facing the closed end of the preform being reflective for the radiation emitted by said sources, and being inclined,
   wherein said plate is supported by said wall of the lateral walls that supports said radiation sources,
   wherein said lower face of said plate is inclined at an angle such that the radiation is reflected toward the preform and toward said lateral wall opposite said lateral wall supporting the radiation sources, and
   wherein said transverse plate is positioned with fastening means identical to the fastening means for fastening each radiation source in a respective support member, so that said transverse plate can be fitted instead of a radiation source in the support therefore.

2. The heating device as claimed in claim 1, wherein said angle of inclination of said lower face of said plate is between 10° and 30°.

3. The heating device as claimed in claim 1, configured to support the preform neck down and such that a closed end of the perform is up, so that the losses due to convection are limited.

4. The heating device as claimed in claim 1, wherein said transverse plate is removably mounted.

5. The device as claimed in claim 1, wherein said radiation sources are of tubular general shape and wherein said transverse plate is of elongate shape and has the same length as a radiation source.

6. The device as claimed in claim 1, wherein said means for fastening said transverse plate are longitudinal projecting fingers of the same conformation as the contact sockets provided for the radiation sources and suitable for being engaged in said members for supporting the contact sockets of the radiation sources.

7. The device as claimed in claim 1, wherein said transverse plate has a width corresponding to about three-quarters of the space between the two lateral walls.

8. The device as claimed in claim 1, this heating device being elongate and including transport means for moving the preform between the two walls, parallel to them, wherein transverse plates are placed at certain selected locations between said two walls so that the preform moved between said walls is subjected to a predetermined heating profile.

9. The device as claimed in claim 1, wherein said lower face of said transverse plate facing said closed end of the preform is coated with a layer of a ceramic that is reflective for the wavelength of the radiation.

10. The device as claimed in claim 1, wherein said transverse plate is made of aluminum.

11. A device for heating at least one preform for the manufacture of a container-made of a thermoplastic by blow molding or stretch-blow molding the preform, the perform having a body and a neck, the heating device comprising:
   two opposing lateral walls configured for receiving the preform there between;
   radiation sources supported by one of the two lateral walls and arranged to face the body of the perform;
   at least one transverse plate placed above and near a closed end of the preform when the perform is positioned between the two lateral walls, the transverse plate extending at least partly between vertical planes defined by the two lateral walls, a lower face of the transverse plate configured to face the closed end of the preform, the lower face of the transverse plate comprising a reflective surface that reflects radiation emitted by the radiation sources; and
   the lower face of the transverse plate inclined relative to the lateral wall supporting the radiation sources at an angle such that radiation from the radiation sources reaching the reflective surface is reflected toward the preform and toward the lateral wall opposite the lateral wall supporting the radiation sources.

12. The device as claimed in claim 11, wherein the transverse plate is supported by the lateral wall that supports the radiation sources.

13. The device as claimed in claim 11, wherein the transverse plate is fastened to the lateral wall that supports the radiation sources with a coupling matching the coupling that fastens each radiation source in a respective support member in the lateral wall that supports the radiation sources so that one of the radiation sources can be replaced by the transverse plate by fastening the transverse plate to the lateral wall in the same manner as the replaced radiation source was fastened to the lateral wall.

14. The device as claimed in claim 11, wherein the transverse plate is inclined upwards so as to extend away from the radiation sources.

15. The device as claimed in claim 13, wherein the coupling fastening the transverse plate comprises a longitudinal projecting finger of the same configuration as a contact socket provided for each of the radiation sources so as to be engaged in the respective support member for supporting the contact socket for the radiation sources.

16. The device as claimed in claim 1, comprising a plurality of the transverse plates, wherein the lateral two walls extend in an elongated manner and comprises a transport that moves the preform along a transport path between the two walls, and the transverse plates are placed at selected locations between the two walls with one or more locations along the transport path of the perform not having a transverse plate so that the preform moved along the transport path is subjected to a predetermined heating profile corresponding to the locations of the transverse plates.

17. The heating device as claimed in claim 11, wherein the lower face of the plate is inclined relative to the lateral wall supporting the radiation sources at an angle between 10° and 30°.

18. The heating device as claimed in claim 11, configured to support the preform neck down such that a closed end of the perform is up so as to limit losses due to convection.

19. The device as claimed in claim 11, wherein the transverse plate has a width that is about three-quarters of the distance between the two lateral walls.

* * * * *